US009830726B2

(12) United States Patent
Deitrich

(10) Patent No.: US 9,830,726 B2
(45) Date of Patent: Nov. 28, 2017

(54) PROVIDING COORDINATING LOCATION INFORMATION USING A GRIDDED REFERENCE GRAPHIC (GRG)

(71) Applicant: BAE Systems Information Solutions Inc., McLean, VA (US)

(72) Inventor: Scott Deitrich, Haymarket, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 128 days.

(21) Appl. No.: 14/808,604

(22) Filed: Jul. 24, 2015

(65) Prior Publication Data

US 2017/0024917 A1    Jan. 26, 2017

(51) Int. Cl.
*G06T 11/60*    (2006.01)

(52) U.S. Cl.
CPC .................................. *G06T 11/60* (2013.01)

(58) Field of Classification Search
None
See application file for complete search history.

(56) References Cited

U.S. PATENT DOCUMENTS

| | | | | |
|---|---|---|---|---|
| 2004/0098200 A1* | 5/2004 | Wentland | .................. | G01V 1/34 702/2 |
| 2011/0007962 A1* | 1/2011 | Johnson | ............. | G06F 17/30781 382/154 |
| 2011/0205850 A1* | 8/2011 | Annambhotla | ...... | G06Q 10/109 368/14 |
| 2013/0273898 A1* | 10/2013 | Wesby | ................... | G06Q 40/00 455/419 |
| 2014/0316616 A1* | 10/2014 | Kugelmass | ............ | G05D 1/101 701/8 |
| 2015/0363641 A1* | 12/2015 | Navulur | ............. | G06K 9/00476 382/113 |

* cited by examiner

*Primary Examiner* — Yi Wang
(74) *Attorney, Agent, or Firm* — Maine Cernota & Rardin

(57) ABSTRACT

A system for real-time or near real-time coordination of personnel and a method for creating a gridded reference graphic (GRG) for use in such a system is provided. A GRG is created by obtaining imagery of an area a team is to be operating in, wherein the imagery is obtained from overhead, taken from a position substantially orthogonal to the central portion of the area of operation. A grid, which may then be further modified with labels allowing identification of areas within the grid, is then overlaid thereon, creating a GRG. The GRG may then be served to personnel and displayed on a user device. The system includes a GRG comprising scale images of an intended area of operation, a labeled grid overlaid thereon and a scale for measurement of distances wherein the GRG are dispersed among and displayed to personnel.

14 Claims, 2 Drawing Sheets

PROVIDING COORDINATING LOCATION INFORMATION USING A GRIDDED REFERENCE GRAPHIC (GRG)

FIELD OF THE INVENTION

The invention relates to the coordination and identification of personnel in a designated area, and, more particularly, to systems and methods for providing coordinating location and identification information using gridded reference graphics.

BACKGROUND OF THE INVENTION

Existing systems and methods for coordination and identification of personnel in designated areas are limited and lacking in both simplicity and effectiveness. Personnel using such systems and methods often have difficulty verbally, or otherwise, identifying and coordinating their locations. This is especially true in complex, unfamiliar and non-sign-marked locations, contributing to confusion that may hamper operational efforts.

Improved techniques for the coordination and rapid identification of the geospatial locations of personnel would be especially useful where personnel lack intimate familiarity with the area in which they are operating. Such personnel may be first responders, security teams, especially those operating in a crowded environment, military personnel, those conducting a missing person search and other market segments where real-time or near real-time visualization of the locations of those working together would be beneficial.

What is needed, therefore, are simple, visual, real-time apparatuses and methods that enable effective coordination of and communication between personnel, especially those operating in an unknown or relatively unknown environment.

SUMMARY OF THE INVENTION

By utilizing readily available data, such as the locations of personnel and points of interest on grid-based annotated imagery, better coordination, faster response times and more complete coverage of an area may be achieved.

One embodiment of the present invention provides a method of creating a gridded reference graphic for coordination of teams comprising: obtaining imagery of an area a team is to be operating in wherein the imagery is obtained from overhead, the imagery being taken from a position substantially orthogonal to the central portion of the area of operation; overlaying a grid on the imagery further comprising labels allowing identification of individual areas within the grid, creating a gridded reference graphic; serving the gridded reference graphic to personnel; and displaying the gridded reference graphic on a user device.

Another embodiment of the present invention provides such a method wherein the imagery obtained is orthorectified.

A further embodiment of the present invention provides such a method further comprising orthorectifying the obtained imagery prior to overlaying of a grid thereon.

Yet another embodiment of the present invention provides such a method further comprising adding annotations, labels, a scale for measurement and a coordinate system to the gridded reference graphic.

A yet further embodiment of the present invention provides such a method wherein the gridded reference graphic is saved to a staging area prior to being served to personnel.

Still another embodiment of the present invention provides such a method wherein the gridded reference graphic is displayed geospatially.

A still further embodiment of the present invention provides such a method wherein the display further comprises personnel locations and movements overlaid thereon.

Even another embodiment of the present invention provides such a method further comprising coordinating personnel using the gridded reference graphic labels to describe locations.

One embodiment of the present invention provides a system for the real-time or near real-time coordination of personnel comprising: a gridded reference graphic comprising scale images of an intended area of operation, a labeled grid overlaid thereon and a scale for measurement of distances wherein the gridded reference graphics are dispersed among and displayed to personnel operating in the area of operation.

Another embodiment of the present invention provides such a system wherein the scale images are orthorectified.

A further embodiment of the present invention provides such a system wherein the gridded reference graphic further comprises annotations.

Yet another embodiment of the present invention provides such a system wherein the gridded reference graphic is dispersed to the personnel as printed copies.

A yet further embodiment of the present invention provides such a system further comprising a plurality of mobile computing devices to which the gridded reference graphic is dispersed and displayed.

Still another embodiment of the present invention provides such a system wherein the gridded reference graphic further comprises real-time or near real-time indications of personnel locations and movements overlaid thereon.

A still further embodiment of the present invention provides such a system wherein the mobile computing devices comprise a processor, a display, a Global Positioning System and a WiFi system.

Even another embodiment of the present invention provides such a system further comprising a staging area on which the gridded reference graphic is uploaded prior to dispersion to personnel.

An even further embodiment of the present invention provides such a system wherein the mobile computing devices receive the gridded reference graphic and updates thereto from a central server.

A still even another embodiment of the present invention provides such a system wherein the mobile computing devices receive the gridded reference graphic and updates thereto through ad-hoc network connections between the plurality of mobile computing devices.

Still yet another embodiment of the present invention provides such a system wherein the ad-hoc network connections are made and maintained via WiFi.

A still yet further embodiment of the present invention provides such a system further comprising icons identifying points of interest.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
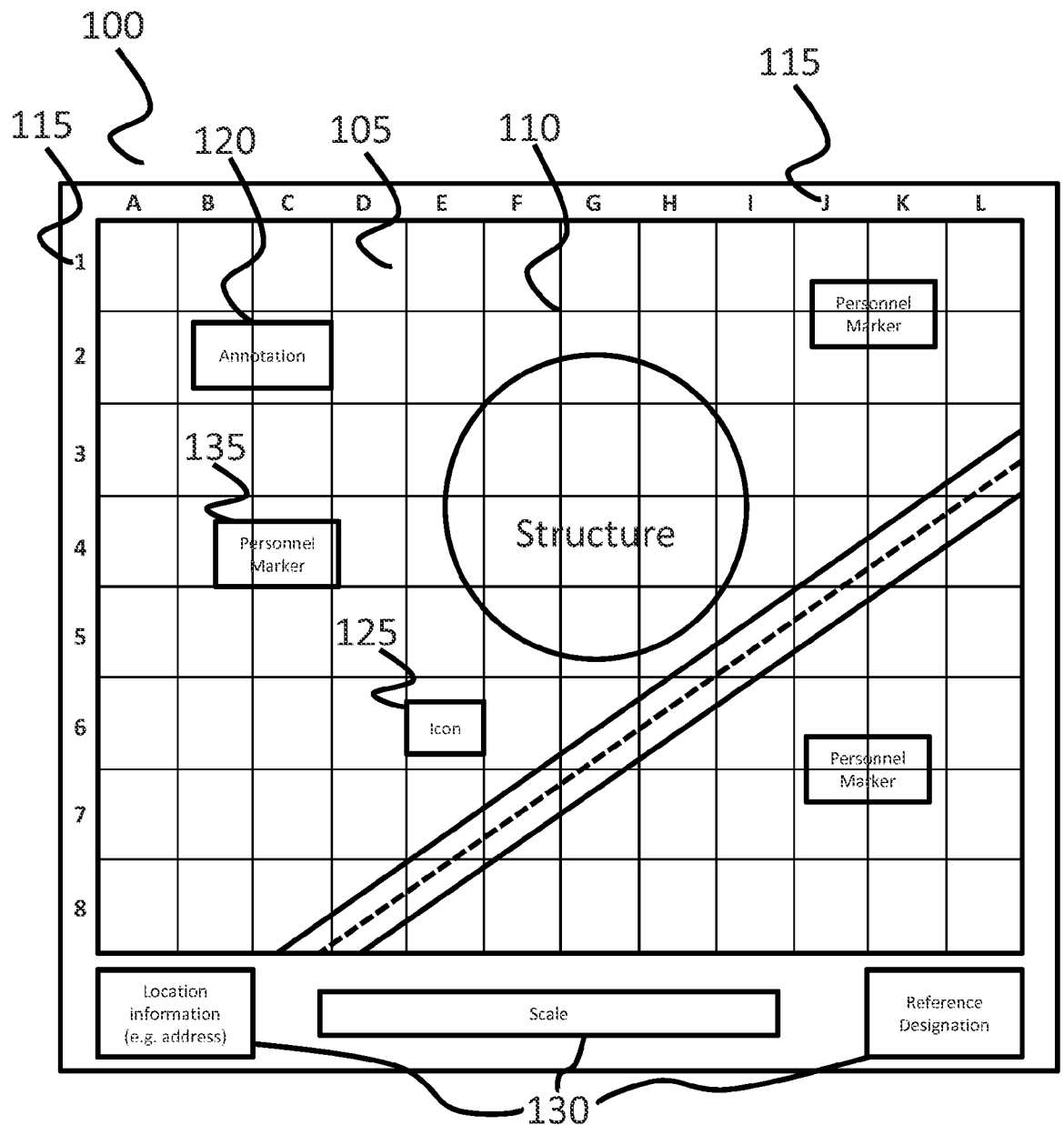
FIG. 1 is a gridded reference graphic in accordance with embodiments of the present invention.
Figure 2:
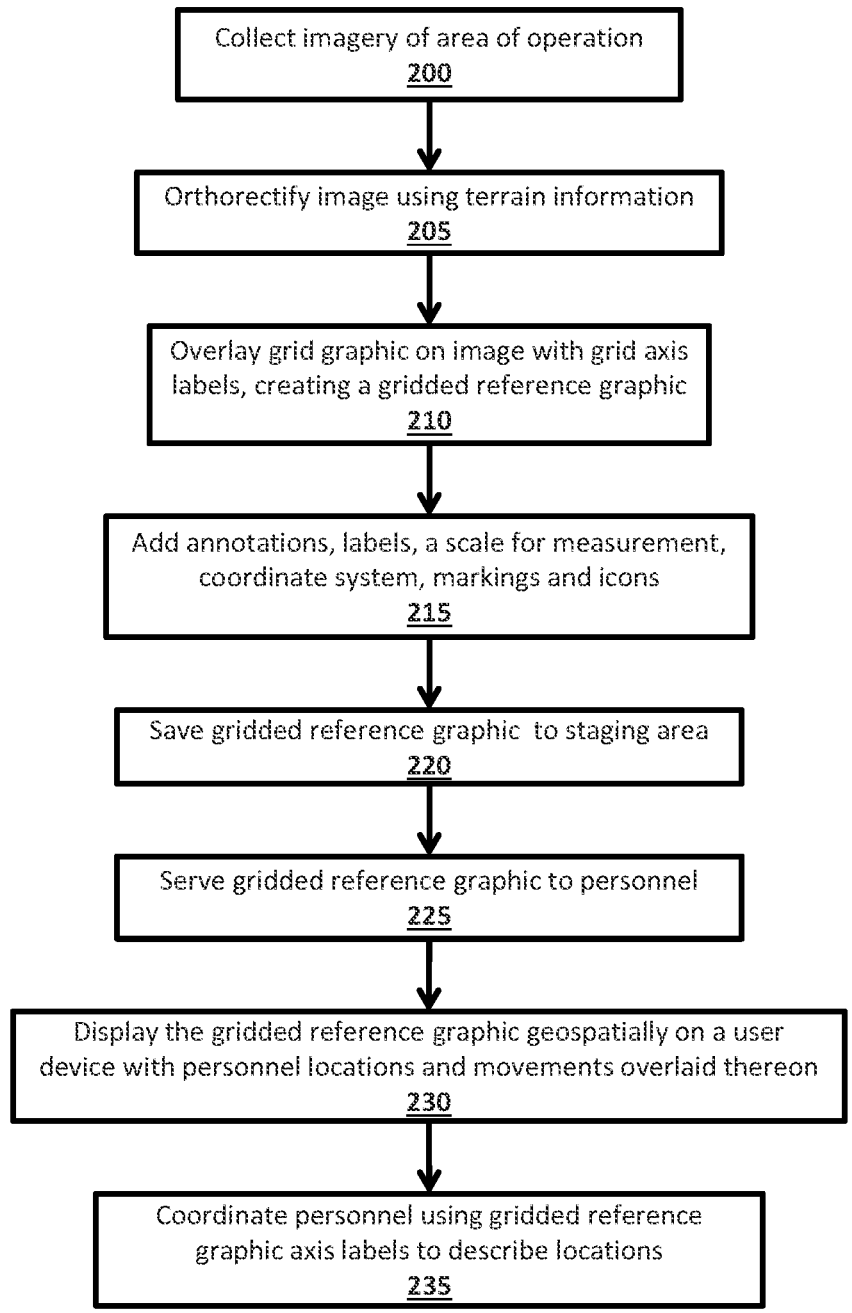
FIG. 2 is a flowchart describing a method in accordance with embodiments of the present invention.

The present disclosure concerns visual, real-time and near real-time systems and methods that enable effective coordination of team members performing operations through utilization of the locations of team members and points of interest superimposed on grid-based annotated imagery 100.

A starting point for the systems and methods of the current disclosure is the creation of a Gridded Reference Graphic (GRG) 100. A GRG 100 in accordance with embodiments of the present invention comprises an image 105 of a geospatial area of interest with an overlaid grid 110 having simple alphabetical and numerical labels and/or an actual coordinate system 115 along the axes, forming a reference coordinate system 115, and including annotations 120 for points of interest.

The creation of a gridded reference graphic 100 for use with embodiments of the present invention involves first obtaining imagery 105 of an intended area of operation and the surrounding area 200. The imagery 105 obtained should, generally, be from overhead, and as close to orthogonal to the central area of the intended area of operation, the nadir, as possible.

The nadir at a given point is the local vertical direction pointing in the direction of the force of gravity at that location. Imagery 105 may be an earth image, picture, chart, schematic, blueprint, map, diagram or other suitable image. The imagery 105, if not already, may also be converted to an electronic format. Before or after the conversion to an electronic format, the imagery 105 may, advantageously, be resampled and orthorectified using software or other suitable methods in conjunction with terrain elevation data to enhance its accuracy 205.

As used in this specification, orthorectification should be understood to refer to the process of removing the effects of image perspective (tilt) and relief (terrain) effects for the purpose of creating a planimetrically correct image. The resultant image, referred to as an orthorectified image or orthoimage, has a constant scale wherein features are represented in their 'true' positions. This allows for the accurate direct measurement of distances, angles, and areas (i.e. mensuration). Orthorectified images are commonly used as in visualization tools such as Google Earth, OSSIM Planet, ArcMap, WMS, etc.

The requisite inputs for orthorectification consist of an image with accurate sensor geometry and an elevation model of the ground surface in Digital Elevation Model (DEM), Digital Terrain Elevation Data (DTED), Shuttle Radar Topography Mission (SRTM) or other compatible format. The resulting accuracy of the orthoimage depends on the accuracy of the triangulation, the resolution of the source image and the accuracy of the elevation model.

After obtaining suitable imagery 105 and converting the imagery 105 to a suitable format, a grid 110 may then be overlaid thereon 210, creating a GRG 100. The grid 110, in embodiments, comprises a series of perpendicular, substantially equally spaced, lines atop the image 105 and axis labels 115.

The grid 110 may further be arbitrarily oriented or aligned with a reference coordinate system 115. The GRG 100 may also contain labels along one or more axis, such that a specific portion of the grid 110 may be readily called out using the axis labels 115. Alternatively, the GRG 105 may contain labels 115 on the individual cells created by the perpendicular, substantially equally spaced, lines overlaid on the image 105. The GRG 100 cell height, width and number, in embodiments, may be controlled by a user or programmatically determined.

After a grid 110 has been overlaid on a GRG 100, the GRG 100 is then, in embodiments, annotated 120. Annotation 120 of the GRG 100 comprises augmenting the existing imagery 105 and GRG 100 information with callouts, labels, measurements, shadings, zone markings, terrain information, graphical emphasis, lines, shapes, icons 125 and/or additional information 130/215. This annotation 120 information may then be saved as part of the GRG 100 or as a different layer distinct from the GRG 100. As with the grid 110 itself, the size, shape, color, opacity and other details of these annotations 120, in embodiments, may be controlled by a user, generated programmatically, or generated in accordance with saved user profiles. The GRG 100 may also be used without annotations 120 if desired.

Further customizations to the GRG 100 to suit individual user preferences are also contemplated in embodiments, where line thickness, color, opacity, and overall appearance may be controlled by a user and/or predefined where the GRG 100 is programmatically generated. An individual user may also save customized profiles, which may be used to generate GRGs 100 or reconstitute GRGs 100, even during use.

After a GRG 100, with or without annotations 120, is created, it must then be published, so that it is accessible to those having a need to use it, and stored. The GRG 100 may, in embodiments, be saved in an electronic format compatible with mobile devices and delivered to a hosted data storage location accessible to the intended users 220. The hosted data storage location may be in the cloud or in a local data storage location. Some embodiments may alternatively store the GRG 100 on individual user devices.

After storing and publishing the GRG 100, it must then be disseminated or served to the intended users 225. In embodiments, dissemination of the GRG 100 from its location is to users' mobile devices. Dissemination methods include email, Hypertext Transfer Protocol (HTTP) or Hypertext Transfer Protocol Secure (HTTPS), File Transfer Protocol (FTP) or Secure File Transfer Protocol (SFTP), copy to a portable drive or SIM card, send to a printer, or other forms of electronic file delivery. Alternatively, the GRG 100 may be pushed to other user devices via an ad-hoc network, allowing dissemination without the use of a Wide or Local Area Network (WAN/LAN). In some embodiments, the GRG 100 or variations thereof may be selectively disseminated to a subset of users or different GRGs 100 disseminated to different users, based on permissions, rankings, roles, their need to know, professions and/or other factors. Updates made to the GRG 100 in its publishing location may be synced to users automatically or on demand.

After the GRG 100 or GRGs 100 are disseminated, they are then displayed to the users 230. In embodiments, the GRG 100 is displayed on each user's mobile device. In this context, a mobile device may be a smartphone, tablet, phablet, wearable, or other data-connected carry-able device. In embodiments, specific subsets of GRG 100 information may be selectively displayed or emphasized to different users, even those receiving the identical GRG 100 based on permissions, rankings, roles, need to know, professions or other factors. In other embodiments the GRG 100 may be printed and handed out to users.

Still other embodiments display a base map beneath the GRG 100 on each user's mobile device while data connectivity to a map service provider is present. Base maps may also be loaded onto each user's device to be utilized instead of or in addition to a map service provider, or when connectivity is not available. In embodiments, users also have the ability to pan and zoom on the GRG 100 and base map, if available.

In addition to the GRG 100 and base map, the map, as seen by a user, in embodiments, will also display information about other users, particularly where those other users are working together as a team. This may be advantageously accomplished, in the case of a team working together, by graphically showing each team member's real or near-real time location by feeding the location from each team member's device to a server and streaming the locations from the server to each device. This could also be accomplished via an ad-hoc network comprising the individual user devices should broader network connectivity be unavailable or insecure. Should real-time information not be available, each team member's most recently reported location could instead be overlaid onto the GRG 100 using a personnel marker 135, which may be generic, color-coded or otherwise representative of a specific user and may further contain information about the marked user, either directly displayed or able to be displayed upon demand by a user. If no data connectivity is available on the mobile device, team member location may be omitted from the display. Embodiments of the present disclosure also provide the ability to toggle each team member's name and/or relevant information, which may be in the form of a profile, on the display.

Coordination of teams based on available information, including provisions for visualization in real-time or near real-time of team member deployments and movement tracking on the GRG 100 allows for the precise direction of team members, through the use of simple yet specific GRG 100 locations 235. The GRG 100 may also be updated with additional annotations and information as it becomes available. With an entire team communicating utilizing an annotated GRG 100 or GRGs 100, information is more easily shared and directions more easily given and understood, resulting in a safer and more efficient working environment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of creating a gridded reference graphic for coordination of teams comprising:
    obtaining imagery of an area a team is to be operating in wherein said imagery is obtained from overhead, said imagery being taken from a position substantially orthogonal to the central portion of the area of operation;
    overlaying a grid on said imagery further comprising labels allowing identification of individual areas within the grid, creating a gridded reference graphic;
    overlaying information regarding locations and movements of specific personnel or groups thereof on said gridded reference graphic;
    selectively serving the gridded reference graphic to specific personnel or groups thereof;
    displaying the gridded reference graphic on a user device; and
    substantially continuously automatically-updating, in real-time, said information regarding the locations and movements of specific personnel or groups thereof on said gridded reference graphic;
    wherein the step of selectively serving the gridded reference graphic to specific personnel or groups thereof is performed by a server, or, if the server is not available, through pushing the gridded reference graphic from one user's mobile device to another through an ad-hoc network.

2. The method of claim 1 wherein the imagery obtained is orthorectified.

3. The method of claim 1 further comprising orthorectifying the obtained imagery prior to overlaying of a grid thereon.

4. The method of claim 1 further comprising adding annotations, labels, a scale for measurement and a coordinate system to the gridded reference graphic.

5. The method of claim 1 wherein the gridded reference graphic is displayed geospatially.

6. The method of claim 1 further comprising coordinating personnel using said gridded reference graphic labels to describe locations.

7. A system for the real-time coordination of personnel comprising:
    a gridded reference graphic comprising scale images of an intended area of operation, a labeled grid overlaid thereon, a scale for measurement of distances, and substantially continuously automatically-updated real-time or indications of personnel locations and movements overlaid thereon, wherein said gridded reference graphic is dispersed among and displayed to specific personnel or groups thereof operating in said area of operation, wherein the gridded reference graphic is stored on and distributed by a server, or, if the server is not available, stored on at least computing device used by personnel to display the gridded reference graphic and distributed by an ad-hoc network comprising computing devices that are also used by personnel to display the gridded reference graphic.

8. The system of claim 7 wherein said scale images are orthorectified.

9. The system of claim 7 wherein said gridded reference graphic further comprises annotations.

10. The system of claim 7 wherein said gridded reference graphic is dispersed to said personnel as printed copies.

11. The system of claim 7 further comprising a plurality of mobile computing devices to which said gridded reference graphic is dispersed and displayed.

12. The system of claim 11 wherein said mobile computing devices comprise a processor, a display, a Global Positioning System and a wireless communications system.

13. The system of claim 7 wherein said ad-hoc network connections are made and maintained via wireless communications.

14. The system of claim 7 further comprising icons identifying points of interest.

* * * * *